(12) United States Patent
Sato et al.

(10) Patent No.: US 9,586,703 B2
(45) Date of Patent: Mar. 7, 2017

(54) COOLING DEVICE FOR USE IN SPACE ENVIRONMENT

(71) Applicant: MITSUBISHI HEAVY INDUSTRIES, LTD., Tokyo (JP)

(72) Inventors: Tatsuya Sato, Tokyo (JP); Ryoichi Kanazawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 573 days.

(21) Appl. No.: 13/803,513

(22) Filed: Mar. 14, 2013

(65) Prior Publication Data
US 2013/0255303 A1 Oct. 3, 2013

(30) Foreign Application Priority Data

Mar. 30, 2012 (JP) .................................. 2012-080055

(51) Int. Cl.
*F28C 1/00* (2006.01)
*B64G 1/50* (2006.01)
(Continued)

(52) U.S. Cl.
CPC ............... *B64G 1/50* (2013.01); *F24F 5/0035* (2013.01); *F24F 6/043* (2013.01); *F25B 19/00* (2013.01); *F25B 39/02* (2013.01); *F28D 7/10* (2013.01); *F28D 7/106* (2013.01); *F28D 21/0015* (2013.01); *F28F 1/06* (2013.01); *F28F 1/08* (2013.01); *F28F 3/042* (2013.01);
(Continued)

(58) Field of Classification Search
CPC ........ F24F 6/043; F28D 21/0015; B64G 1/50; F28F 13/003

USPC ..................................................... 62/315, 316
See application file for complete search history.

(56) References Cited

U.S. PATENT DOCUMENTS 2,766,597 A * 10/1956 Gieck ............................ 62/315
3,196,634 A 7/1965 Rich
(Continued)

FOREIGN PATENT DOCUMENTS

JP 1-310295 12/1989
JP 03-91623 4/1991
(Continued)

OTHER PUBLICATIONS

Rubik B. Sheth et al., "Investigation of Transient Performance for a Sublimator", 41st International Conference on Environmental Systems, Jul. 17-21, 2011, Portland, OR, United States (http://ntrs.nasa.gov/archive/nasa/casi.ntrs.nasa.gov/20100021978_2010023392.pdf).
(Continued)

*Primary Examiner* — Orlando E Aviles Bosques
(74) *Attorney, Agent, or Firm* — Wenderoth, Lind & Ponack, L.L.P.

(57) ABSTRACT

A space-environment dedicated cooling device includes a first flow path to which coolant to be cooled is fed, a second flow path thermally coupled to the first flow path and a water absorbing body which is exposed to the space environment when the cooling device is used in the space environment. The second flow path is fed with feedwater. The water absorbing body is fed with the feedwater from the second flow path. The water absorbing body includes a water absorbing member made of water-absorbing material.

4 Claims, 4 Drawing Sheets

(51) Int. Cl.
    *F24F 5/00* (2006.01)
    *F25B 19/00* (2006.01)
    *F25B 39/02* (2006.01)
    *F28F 3/04* (2006.01)
    *F28F 13/00* (2006.01)
    *F28D 7/10* (2006.01)
    *F28D 21/00* (2006.01)
    *F28F 1/06* (2006.01)
    *F28F 1/08* (2006.01)
    *F24F 6/04* (2006.01)
    *B64G 6/00* (2006.01)

(52) U.S. Cl.
    CPC .............. *F28F 13/003* (2013.01); *B64G 6/00* (2013.01); *F28D 2021/0021* (2013.01); *F28D 2021/0064* (2013.01); *F28D 2021/0071* (2013.01)

(56) References Cited

U.S. PATENT DOCUMENTS

| | | | | |
|---|---|---|---|---|
| 4,935,169 | A * | 6/1990 | Ernst | ................................ 62/316 |
| 2002/0038704 | A1* | 4/2002 | Houle | ................. H01L 21/4882 |
| | | | | 165/185 |
| 2007/0106269 | A1* | 5/2007 | Hood et al. | ................ 604/890.1 |
| 2007/0107875 | A1* | 5/2007 | Lee | ........................ H01L 23/427 |
| | | | | 165/104.26 |
| 2008/0021529 | A1 | 1/2008 | Selm et al. | |
| 2010/0032145 | A1* | 2/2010 | Lee | .......................... F24F 3/147 |
| | | | | 165/133 |
| 2013/0171491 | A1* | 7/2013 | Wei | ..................... H01M 2/1077 |
| | | | | 165/47 |

FOREIGN PATENT DOCUMENTS

| | | |
|---|---|---|
| JP | 2521541 | 8/1996 |
| JP | 2563151 | 9/1996 |
| JP | 2563148 | 12/1996 |
| JP | 2782272 | 7/1998 |
| JP | 2863662 | 3/1999 |
| JP | 2009-086281 | 4/2009 |
| JP | 2009-112347 | 5/2009 |

OTHER PUBLICATIONS

James R. Jaax et al., "Thermodynamic Performance Testing of the Orbiter Flash Evaporator System", in the Proceedings of the 11th Space Simulation Conference, Jan. 1, 1980, pp. 43-54.
Office Action issued Nov. 4, 2015 in Japanese Application No. 2012-080055, with partial English translation.
Decision of Refusal issued Nov. 9, 2016 in Japanese Patent Application No. 2012-080055, with English translation.

* cited by examiner

COOLING DEVICE FOR USE IN SPACE ENVIRONMENT

TECHNICAL FIELD

The present invention relates to a cooling device dedicated for use in the space environment, more particularly, relates to a cooling device that uses latent heat of evaporation of water for cooling an object to be cooled in the space environment.

BACKGROUND ART

Cooling is one issue of devices used in the space environment. For example, although a cooling device installed in a space suit is required to cool coolant, ambient air or environmental water (seawater and the like) is not available as a cooling source, differently from cooling devices used on the ground. This implies that a cooling technique different from that used on the ground is required for achieving cooling in the space environment.

One known cooling device for use in the space environment is a sublimator, which uses the latent heat of evaporation of water to cool an object. A sublimator is disclosed in Rubik B. Sheth et al., "Investigation of Transient Performance for a Sublimator", 41st International Conference on Environmental Systems, 17-21 Jul. 2011, Portland, Oreg., United States (http://ntrs.nasa.gov/archive/nasa/casi.ntrs.nasa.gov/20100021978_2010023392.pdf).

FIG. 1 is a cross-sectional view showing the structure of the sublimator disclosed in this document, which is denoted by numeral 100. Feedwater layers 102 and 104 are coupled to both surfaces of a coolant layer 103, respectively, and sublimation plates 101 and 105 are coupled to the feedwater layers 102 and 104, respectively. The coolant layer 103 is used as a path which coolant to be cooled passes through, and the feedwater layers 102 and 104 are used as paths which feedwater passes through. The sublimation plates 101 and 105 are made of porous stainless steel sheet. The feedwater supplied to the feedwater layers 102 and 104 are introduced into the sublimation plates 101 and 105, respectively, and then evaporated into the space environment. This allows capturing heat from the coolant in the coolant layer 103, thereby cooling the coolant.

Other cooling devices which use latent heat of evaporation of water for cooling in the space environment are disclosed, for example, in Japanese Patent Publication No. 2782272 B. The cooling device disclosed in this publication also achieves cooling of the coolant by evaporating water through porous material.

One issue of these cooling devices for use in the space environment is that the porous plate is easily clogged, if the purity of the water used for cooling is low. This undesirably causes deterioration in the cooling efficiency. These cooling devices require high-purity water as the feedwater to be evaporated or sublimated.

SUMMARY OF THE INVENTION

Therefore, an objective of the present invention is to provide a cooling device dedicated for use in the space environment, which does not require high-purity water for cooling.

In an aspect of the present invention, a space-environment dedicated cooling device includes a first flow path to which coolant to be cooled is fed, a second flow path thermally coupled to the first flow path and a water absorbing body which is exposed to the space environment when the cooling device is used in the space environment. The second flow path is fed with feedwater. The water absorbing body is fed with the feedwater from the second flow path. The water absorbing body includes a water absorbing member made of water-absorbing material. In a preferred embodiment, the water absorbing member includes a polymer member made of water-absorbing polymer.

In a preferred embodiment, the cooling device includes an outer pipe and an inner pipe housed in the outer pipe. The first flow path is located inside the inner pipe and the second flow path is located between the inner and outer pipes. The water-absorbing body is formed to surround the outer face of the outer pipe. The outer pipe has a through-hole which feeds the feedwater from the second flow path to the water absorbing body.

In one embodiment, the water-absorbing polymer is selected from the group consisting of crosslinked polyacrylic acid partial sodium salt, sodium poly-acrylate, and farina-acrylic acid graft polymer partial sodium salt.

The present invention provided a cooling device dedicated for use in the space environment, which does not require high-purity water for cooling.

DESCRIPTION OF PREFERRED EMBODIMENTS

The invention will be now described herein with reference to illustrative embodiments.

First Embodiment

Figure 2:
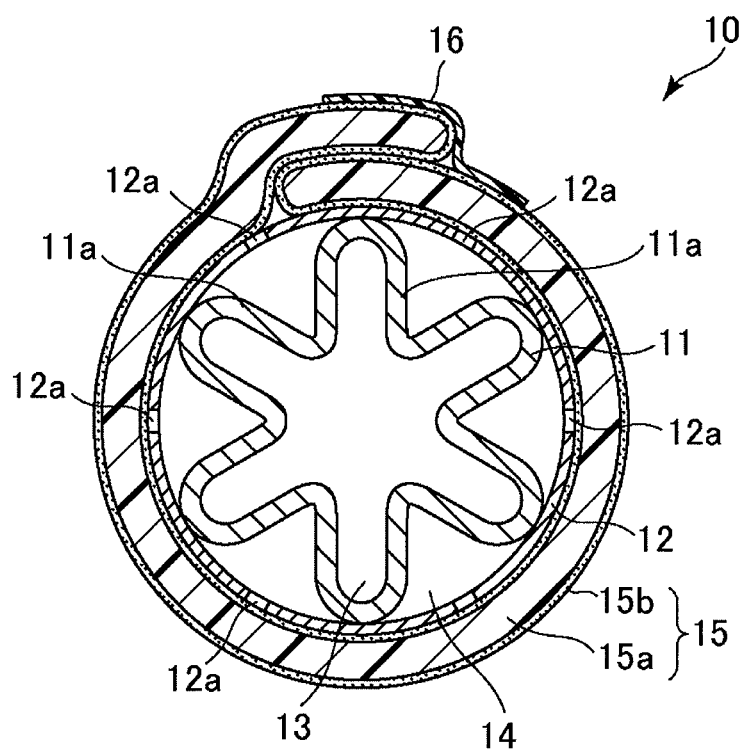
FIG. 2 is a cross-sectional view showing the structure of a cooling device dedicated for use in the space environment in a first embodiment of the present invention.
Figure 3:
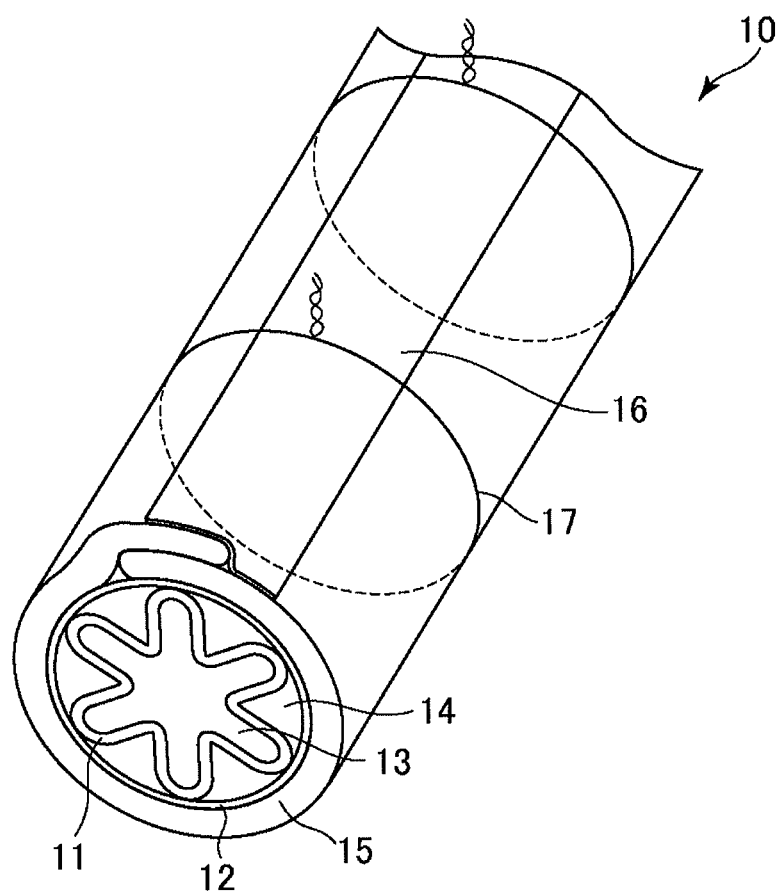
FIG. 3 is a perspective view showing the structure of the cooling device in the first embodiment.

FIG. 2 is a cross-sectional view showing the structure of a cooling device 10, which is dedicated for use in the space environment, in a first embodiment of the present invention, and FIG. 3 is a perspective view showing the structure of the cooling device 10. The cooling device 10 includes an inner pipe 11, an outer pipe 12 and a water absorbing body 15. The water absorbing body 15 is disposed to surround the outer face of the outer pipe 12.

The inner pipe 11 is housed in the outer pipe 12. The space inside the inner pipe 11 is used as an inner flow path 13 and the spaces between the inner pipe 11 and the outer pipe 12 are used as outer flow paths 14. As described later, coolant to be cooled flows through the inner flow path 13 and feedwater to be evaporated or sublimated flows through the outer flow paths 14. In this embodiment, the inner pipe 11 and the outer pipe 12 are both made of metal having a superior thermal conductivity, such as copper. This means that the inner flow path 13 and the outer flow paths 14 are thermally coupled, allowing heat exchange between the coolant flowing through the inner flow path 13 and the feedwater flowing through the outer flow path 14.

The inner pipe 11 has concaves and convexes on the cross-section perpendicular to the longitudinal direction of the cooling device 10. As described later, such structure improves the efficiency of the heat exchange between the coolant flowing through the inner flow path 13 and the feedwater flowing through the outer flow paths 14, and this advantageously improves the cooling efficiency. In detail, the inner pipe 11 has a plurality of protrusions 11a each protruding in the radius direction to reach the inner surface of the outer pipe 12 on the tip. The outer flow paths 14 are each formed as the space defined with the inner surface of the outer pipe 12 and the surfaces of adjacent two protrusions 11a. In this embodiment, the number of the protrusions 11a is six and thus the number of the outer flow paths 14 is also six. It should be noted that the numbers of the protrusions 11a and the outer flow paths 14 are not limited to six.

Through-holes 12a are formed through the outer pipe 12 to communicate with the outer flow paths 14, respectively. As described later, the through-holes 12a are used to feed the feedwater to the water absorbing body 15 from the outer flow path 14.

The water absorbing body 15 has a water absorbing property, providing the function of evaporating the feedwater fed from the outer flow path 14 after temporally holding the feedwater therein. In this embodiment, the water absorbing body 15 includes a polymer portion 15a and an outer casing member 15b. The polymer portion 15a includes a water absorbing member made of water absorbing polymer. It is possible to use polymers with a high water absorbing property, which are gelled upon absorbing water, as the material of the polymer portion 15a. In one embodiment, crosslinked polyacrylic acid partial sodium salt, sodium poly-acrylate, starch-acrylic acid graft polymer partial sodium salt, a hydrolysate of starch-acrylonitrile graft copolymers, a neutralized product of starch-acrylic acid graft polymer, a saponified product of vinyl acetate-acrylic acid ester copolymer, a partially neutralized product of poly acrylic acid or the like may be used as the material of the polymer portion 15a. The outer casing member 15b has the function of holding the water absorbing polymer of the polymer portion 15a. In this embodiment, the outer casing member 15b wraps and holds the polymer portion 15a. The outer casing member 15b is made of material which allows water to pass through, such as nonwoven cloth and metal nets. When the cooling device 10 is used in the space environment, the water absorbing body 15 is exposed to the space environment.

As shown in FIG. 2 and FIG. 3, the water absorbing body 15 is fixed with a tape 16 and wires 17 so that the water absorbing body 15 is in contact with the outer surface of the outer pipe 12. In detail, as shown in FIG. 2, the tape 16 is attached onto the end of the water absorbing body 15, and the tape 16 is further attached onto the intermediate portion of the water absorbing body 15. The water absorbing body 15 is fastened onto the outer surface of the outer pipe 12 with the tape 16. In addition, as shown in FIG. 3, the wires 17 are wrapped around the water absorbing body 15, and both ends of each wire 17 are further twisted to fasten the water absorbing body 15 onto the outer surface of the outer pipe 12. It should be noted that other means may be used to fix the water absorbing body 15 so that the water absorbing body 15 is in contact with the outer surface of the outer pipe 12.

In the following, a description is given of the operation of the cooling device 10 of this embodiment. The cooling device 10 of this embodiment evaporates the feedwater flowing through the outer flow path 14, and the coolant flowing through the inner flow path 13 is cooled by the latent heat of evaporation. In detail, the feedwater flowing through the outer flow paths 14 is gradually fed to the water absorbing body 15 via the through-holes 12a formed through the outer pipe 12. The water supplied to the water absorbing body 15 is once absorbed by the water absorbing polymer of the polymer portion 15a. The water absorbed in the water absorbing body 15 is gradually evaporated into the space environment, since the water absorbing body 15 is exposed to the space environment. The evaporation of the water absorbed in the water absorbing body 15 results in that the water absorbing body 15 is cooled due to the latent heat of evaporation, and the feedwater flowing through the outer flow path 14 is also cooled. Consequently, the coolant flowing through the inner flow path 13 is cooled.

Figure 1:
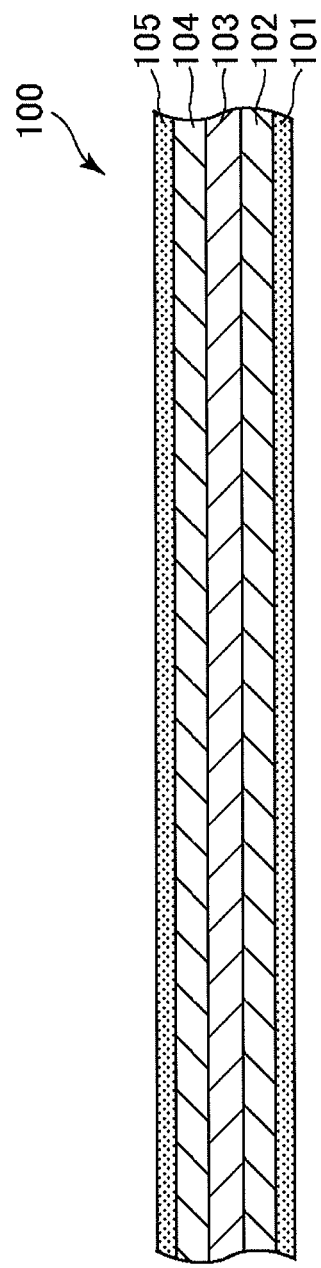
FIG. 1 is the cross-sectional view showing the structure of the conventional sublimator.

One advantage of the cooling device 10 of this embodiment is that the cooling can be achieved without using high-purity water. In this embodiment, the feedwater is absorbed by the water absorbing body 15, more specifically, the water absorbing polymer of the polymer portion 15a, and then evaporated or sublimated. This effectively avoids the problem of the clog of the porous plate which occurs for the sublimator shown in FIG. 1.

Another advantage is that the feedwater is not uselessly discharged out of the cooling device 10, allowing effective use of the feedwater. In the sublimator in FIG. 1, the feedwater may be discharged out of the sublimator before being evaporated or sublimated, if the holes of the sublimation plates 101 and 105 are excessively large. In the cooling device 10 in this embodiment, on the other hand, the feedwater is absorbed by the water absorbing polymer of the polymer portion 15a. This effectively prevents the feedwater from being discharged out of the cooling device 10 before being evaporated.

In addition, the cooling device 10 of this embodiment is structured so that the inner pipe 11 which separates the inner flow path 13 and the outer flow path 14 is shaped to have the concaves and the convexes. This effectively improves the efficiency of the heat exchange between the coolant flowing through the inner flow path 13 and the feedwater flowing through the outer flow path 14. This contributes to the improvement in the cooling efficiency of the coolant flowing through the inner flow path 13.

Second Embodiment

Figure 4:
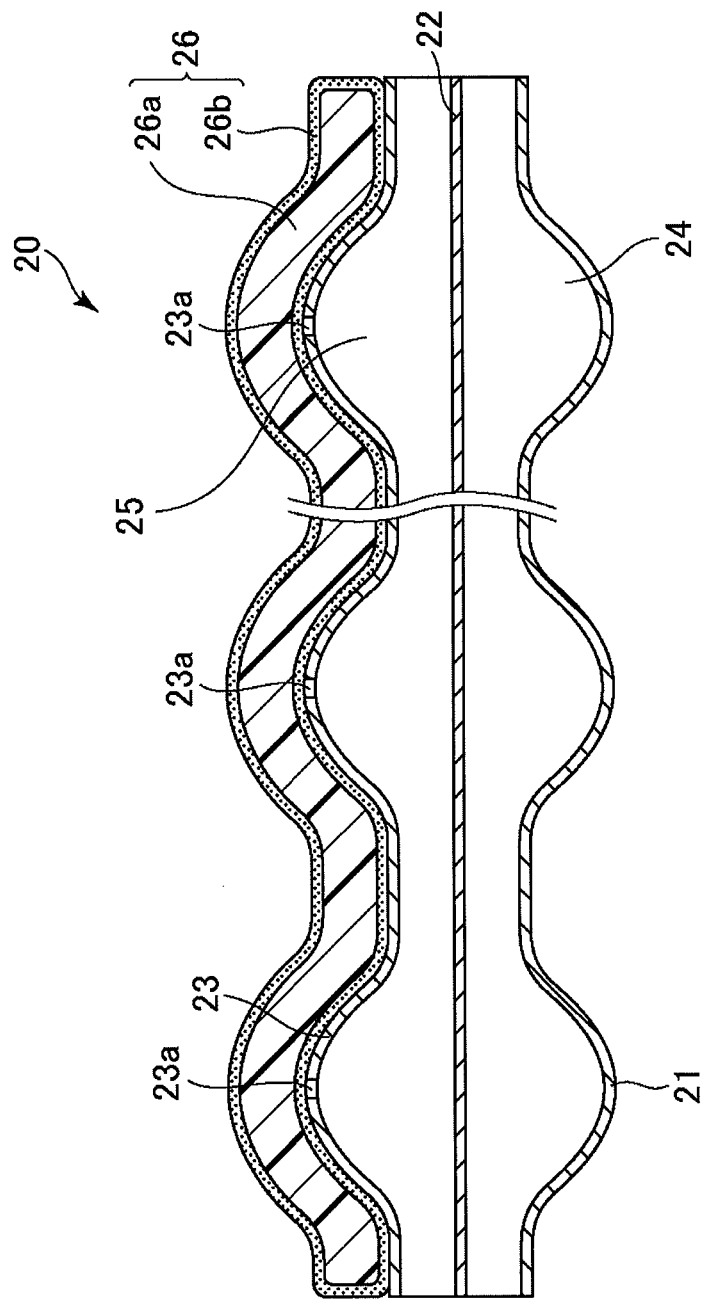
FIG. 4 is a cross-sectional view showing the structure of a cooling device dedicated for use in the space environment in a second embodiment.

FIG. 4 is a cross-sectional view showing the structure of a cooling device 20 dedicated for use in the space environment in the second embodiment of the present invention. The cooling device 20 includes a rear plate 21, a partition wall 22, a front plate 23 and a water absorbing body 26. The rear plate 21 and the partition wall 22 are placed opposed to each other, and a coolant flow path 24 is formed between the rear plate 21 and the partition wall 22. Furthermore, a feedwater flow path 25 is formed between the partition wall 22 and the front plate 23. The rear plate 21, the partition wall 22 and the front plate 23 are all made of metal having a superior thermal conductivity, such as copper. This means that the coolant flow path 24 and the feedwater flow path 25 are thermally coupled, allowing heat exchange between the coolant flowing through the coolant flow path 24 and the feedwater flowing through the feedwater flow path 25.

The front plate 23 has protrusions which protrude in the direction opposite to the partition wall 22 at proper intervals and each protrusion has a penetration hole 23a at the tip or near the tip. Moreover, the water absorbing body 26 is attached to the surface opposite to the partition wall 22 of the front plate 23.

The water absorbing body 26 has the function of temporally holding the feedwater supplied from the feedwater flow path 25 and then evaporating the feedwater, similarly to the water absorbing body 15 used in the first embodiment. The water absorbing body 26 includes a polymer portion 26a and an outer casing member 26b. The polymer portion 26a is made of the water-absorbing polymer, similarly to the polymer portion 15a in the first embodiment. It is possible to use polymers with a high water absorbing property, which are gelled upon absorbing water, as the material of the polymer portion 26a. In one embodiment, crosslinked polyacrylic acid partial sodium salt, sodium poly-acrylate, starch-acrylic acid graft polymer partial sodium salt, a hydrolysate of starch-acrylonitrile graft copolymers, a neutralized product of starch-acrylic acid graft polymer, a saponified product of vinyl acetate-acrylic acid ester copolymer, a partially neutralized product of poly acrylic acid or the like may be used as the material of the polymer portion 26a. The outer casing member 26b has the function of holding the water absorbing polymer of the polymer portion 26a. The outer casing member 26b wraps and holds the polymer portion 26a. The outer casing member 26b is made of the material through which allows water to pass through, such as nonwoven cloth and metal nets. When the cooling device 20 is used in the space environment, the water absorbing body 26 is exposed to the space environment.

The operation of the cooling device 20 in this embodiment is substantially same as the cooling device 10 in the first embodiment. The feedwater flowing through the feedwater flow path 25 is gradually fed to the water absorbing body 26 via the through-holes 23a formed through the front plate 23. The water fed to the water absorbing body 26 is once absorbed by the water absorbing polymer of the polymer portion 26a. The water absorbed in the water absorbing body 26 is gradually evaporated into the space environment, since the water absorbing body 26 is exposed to the space environment. The evaporation of the water absorbed in the water absorbing body 26 results in that the water absorbing body 26 is cooled due to the latent heat of evaporation and the feedwater flowing through the feedwater flow path 25 is also cooled. Consequently, the coolant that is made flow through the coolant flow path 24 is cooled.

The cooling device 20 in this embodiment also achieves cooling without using high-purity water as is the case with the cooling device 10 of the first embodiment. Also in this embodiment, the feedwater is once absorbed by the water absorbing polymer of the polymer portion 26a and then evaporated or sublimated. This effectively avoids the problem of the clog of the porous plate which occurs for the sublimator shown in FIG. 1.

In addition, the feedwater is not uselessly discharged out of the cooling device 20 also in the cooling device 20 in this embodiment, preventing the feedwater from being discharged out of the cooling device 20 before being evaporated.

It should be noted that, although the polymer portions (15a, 26b) made of water absorbing polymer are used in the water absorbing bodies in the above-mentioned embodiments, as, it is possible to use other materials which have a water absorbing property may be used as the water absorbing body. For example, a structure which includes fiber, more specifically, cloth, a stack of cloths, cotton, nonwoven cloth, a stack of nonwoven cloths, and a structure in which a string is wrapped around a core member may be used as the water absorbing member. As described in the above-mentioned embodiments, however, it is preferable to use the water absorbing polymer in view of the superior performance of holding water.

Although the present invention has described above in connection with several embodiments thereof, it would be apparent to those skilled in the art that those embodiments are provided solely for illustrating the present invention, and should not be relied upon to construe the appended claims in a limiting sense.

What is claimed is:

1. A space-environment dedicated cooling device, comprising:
   an outer pipe;
   an inner pipe housed in the outer pipe, the inner pipe having a plurality of protrusions, each of the protrusions protruding in a radius direction such that a tip of the protrusion reaches the outer pipe;
   an inner flow path to which coolant to be cooled is fed, the inner flow path being located inside the inner pipe;
   a plurality of outer flow paths thermally coupled to the inner flow path, each of the outer flow paths being (i) formed as a space defined by an inner surface of the outer pipe and surfaces of two adjacent protrusions from among the protrusions and (ii) fed with feedwater;
   a water absorbing body which is exposed to a space environment when the cooling device is used in the space environment; and
   a plurality of through-holes formed through the outer pipe to respectively communicate with the outer flow paths, the through-holes feeding the feedwater from the outer flow paths to the water absorbing body,
   wherein the water absorbing body includes a polymer member made of a water-absorbing polymer which is configured to be gelled upon absorbing water, and
   wherein the water absorbing body is configured so that the feedwater is evaporated from the polymer member to the space environment when the water absorbing body is exposed to the space environment.

2. The cooling device according to claim 1, wherein the water-absorbing body is formed to surround an outer face of the outer pipe.

3. The cooling device according to claim 1, wherein the water-absorbing polymer is selected from the group consisting of crosslinked polyacrylic acid partial sodium salt, sodium poly-acrylate, starch-acrylic acid graft polymer partial sodium salt, a hydrolysate of starch-acrylonitrile graft copolymers, a neutralized product of starch-acrylic acid graft polymer, a saponified product of vinyl acetate-acrylic acid ester copolymer, a partially neutralized product of poly acrylic acid.

4. A method of cooling coolant in a space environment using a cooling device including (i) an outer pipe, (ii) an inner pipe housed in the outer pipe, the inner pipe having a plurality of protrusions, each of the protrusions protruding in a radius direction such that a tip of the protrusion reaches the outer pipe, (iii) an inner flow path located inside the inner pipe, (iv) a plurality of outer flow paths thermally coupled to the inner flow path, each of the outer flow paths being formed as a space defined by an inner surface of the outer pipe and surfaces of two adjacent protrusions from among the protrusions, (v) a water absorbing body including a polymer member made of a water-absorbing polymer, and (vi) a plurality of through-holes formed through the outer pipe to respectively communicate with the outer flow paths, the method comprising:
   feeding the coolant to the inner flow path;

feeding feedwater to each of the outer flow paths, and feeding the feedwater from the outer flow paths to the water absorbing body via the through-holes;

evaporating the feedwater from the polymer member to the space environment by exposing the water absorbing body to the space environment to evaporate, wherein the water-absorbing polymer is configured to be gelled upon absorbing water.

\* \* \* \* \*